US007236595B1

(12) United States Patent
Bean et al.

(10) Patent No.: US 7,236,595 B1
(45) Date of Patent: Jun. 26, 2007

(54) INTEGRATED OPTICS ENCRYPTION DEVICE

(75) Inventors: Michael L. Bean, Lake Forest, CA (US); Lawrence E. Bean, Lake Forest, CA (US); George A. Pavlath, Thousand Oaks, CA (US); Eric Lee Goldner, Valencia, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/551,587

(22) Filed: Apr. 18, 2000

(51) Int. Cl.
*G06F 17/00* (2006.01)
(52) U.S. Cl. .................. 380/256; 380/255; 380/40
(58) Field of Classification Search ........ 380/255–257, 380/41, 252–254, 40; 713/182–194, 200–202; 359/298–304
See application file for complete search history.

(56) References Cited

U.S. PATENT DOCUMENTS 6,219,793 B1 * 4/2001 Li et al. ............... 713/202
6,484,260 B1 * 11/2002 Scott et al. ............ 713/186
6,594,764 B1 * 7/2003 Wishner et al. ........ 713/202

FOREIGN PATENT DOCUMENTS

EP        0 866 581 A2    9/1998
WO       WO 94/06224     3/1994

OTHER PUBLICATIONS

Improved single-photon detector performance; Fitch, M.J.; Donegan, M.M.; Jacobs, B.C.; Pittman, T.B.; Franson, J.D.; Quantum Electronics and Laser Science, 2003. QELS. Postconference Digest Jun. 1-6, 2003 Page(s):2 pp.*
A Hardware Architecture for Elliptic Curve Cryptography and Lossless Data Compression; Morales-Sandoval, M.; Feregrino-Uribe, C.; Electronics, Communications and Computers, 2005. CONIELECOMP 2005. Proceedings. 15th International Conference on 28-02 F.*
Observation of parametric fluorescence in oxidized AlGaAs waveguides; Leo, G.; Berger, V.; OwYang, C.; Nagle, J.; Lasers and Electro-Optics, 1999. CLEO '99. Summaries of Papers Presented at the Conference on May 23-28, 1999 pp. 268-269.*
Schneier, Bruce—*Applied Cryptography Protocols, Algorithms, and Source Code in C*, 1996 John Wiley & Sons, Inc., pp. 4, and 197-198.
Bean, Michael—*Fiber Optic Encryption*, 1999 Science Fair Project.
Mazurenko, Yu T., et al., "Spectral Coding For Secure Optical Communications Using Refractive Index Dispersion" Optics Communications, North-Holland Publishing Co. Amsterdam, NL, vol. 133, No. 1/6, 1997, pp. 87-92.
Mazurenko, Yu T. et al. "Spectral Coding for Secure Optical Communications Using Refractive Index Dispersion", Optics Communications, North Holland Publishing Co., Amerstam, NL, vol. 133, No. 1/6, 1997, pp. 87-92.

* cited by examiner

*Primary Examiner*—David Jung

(57) ABSTRACT

The present invention relates generally to an integrated optics encryption device. The preferred embodiment of the invention is an integrated optics encryption device comprising a coherent light source connected to a multi-functional integrated optics chip (MIOC). The MIOC comprises two divergent paths with mirrored ends. The MIOC also has an encrypted message output. One path is connected to a message signal input that can alter the refractive index of the path. The other path is connected to a key signal input that can alter the refractive index of the other path.

20 Claims, 2 Drawing Sheets

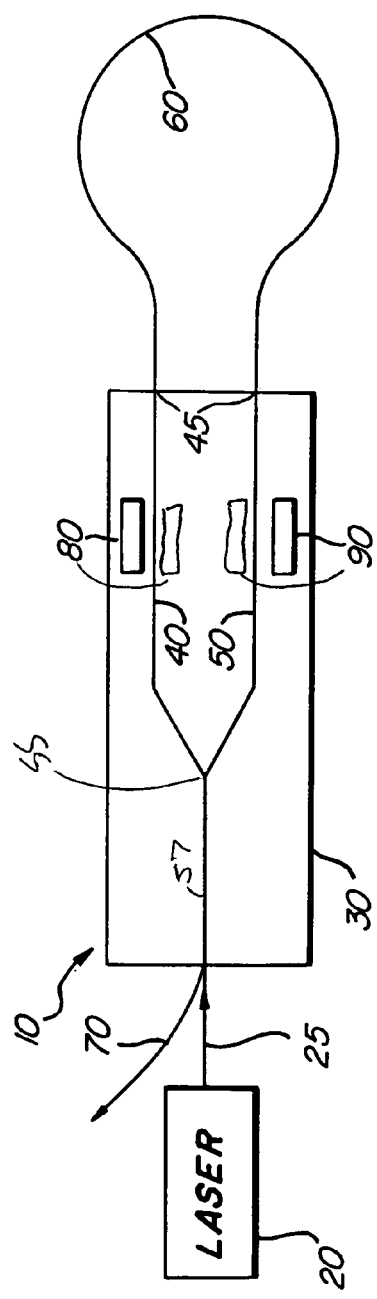
FIG. 1
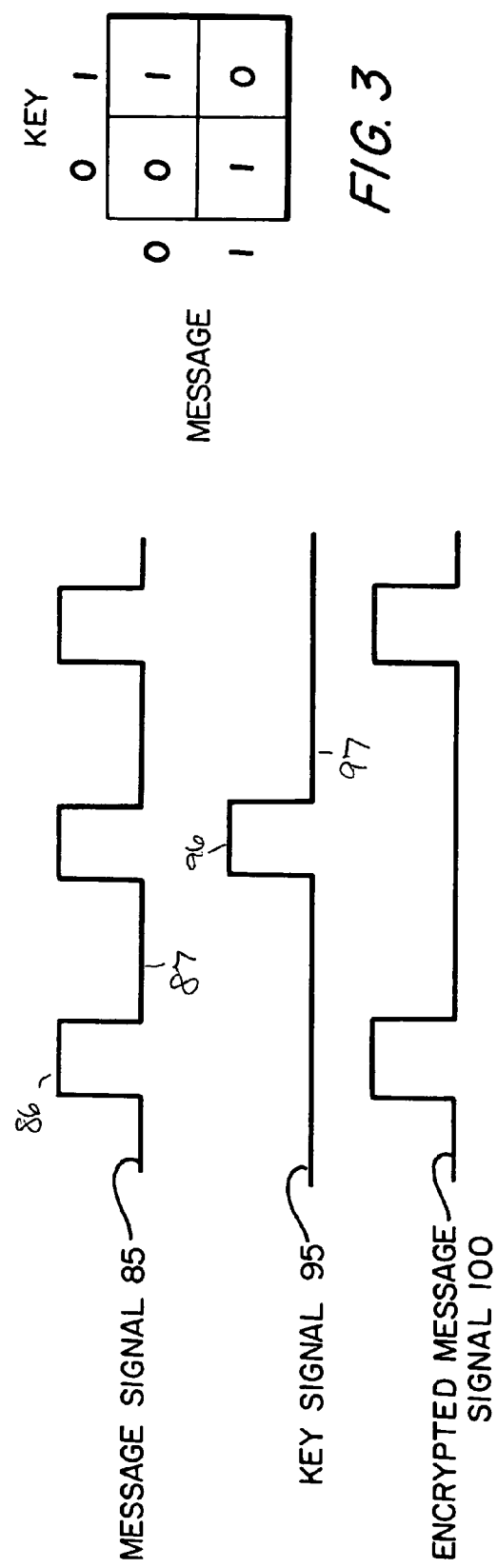
FIG. 2
FIG. 3

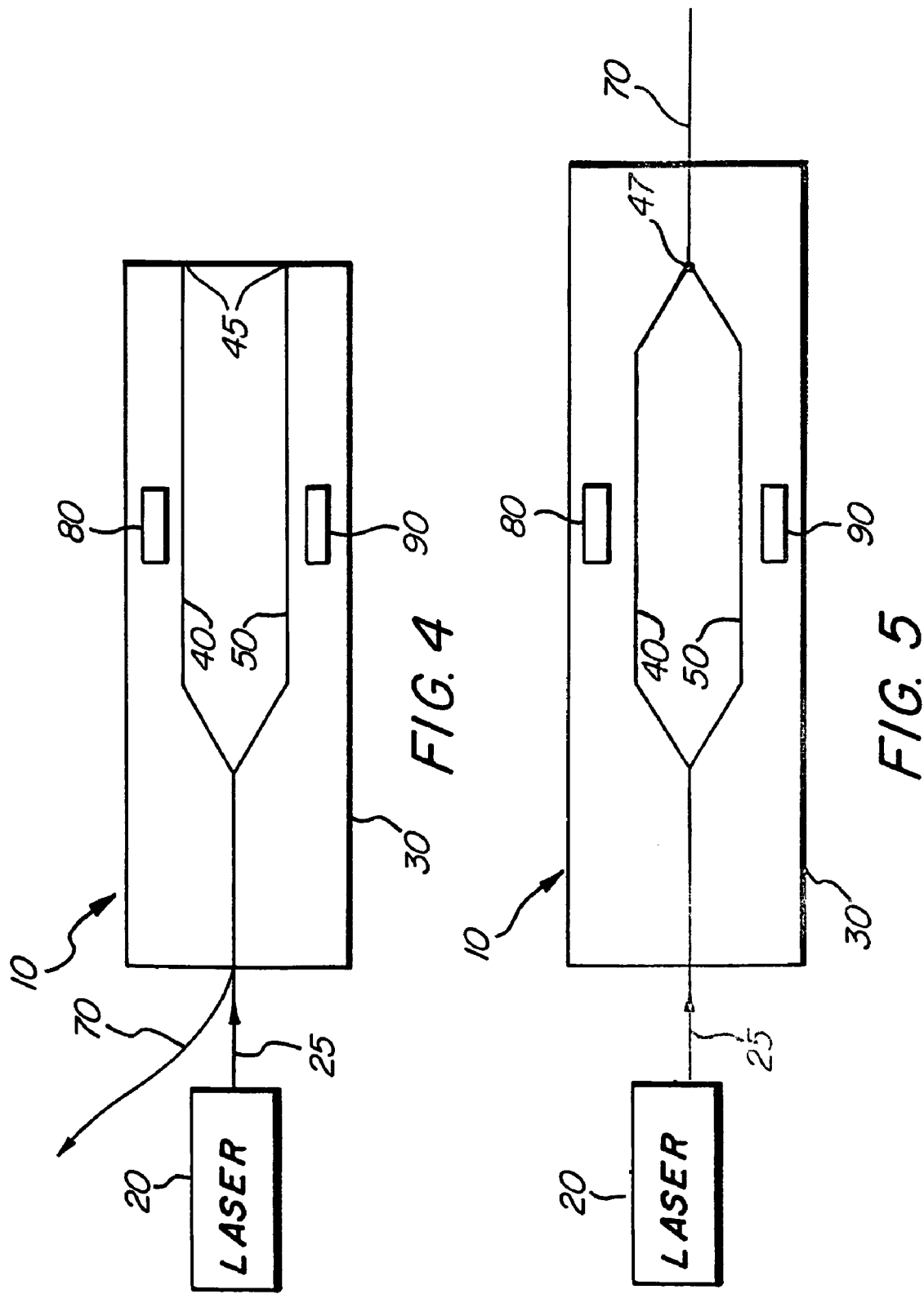

INTEGRATED OPTICS ENCRYPTION DEVICE

BACKGROUND OF THE INVENTION

1. Technical Field

The present invention relates generally to an encryption device. More particularly, the present invention relates to the encryption of a signal through use of a multi-functional integrated optics chip or MIOC.

2. Background Art

The ability to encrypt and decrypt data is becoming increasingly important as e-mail, data files, voice transmissions, and other transmissions travel the Internet. The majority of encryption algorithms focus on encryption of data using software techniques and complex protocols such as a public key/private key system. The software reads plain text and translates it into crypto-text according to the encryption algorithm. The crypto-text is then generally transmitted to another location where a software program uses a key applied to the crypto-text to decrypt the data.

These software methods can be slow and cumbersome particularly regarding the demands that can be made on computer processors by encryption and decryption software. This type of encryption is also vulnerable to unauthorized decryption. For example, the public key/private key system is an asymmetric encryption algorithm. The encryption key is generally available to the public and is therefore vulnerable to chosen-plaintext attacks. Also, the public key/private key system requires the use of prime numbers, increasingly large prime numbers for improved security. Prime numbers become scarcer as they increase in size and require an increasing amount of computational time to obtain. Thus, a high-speed hardware-based encryption device that does not rely on the use of prime numbers is desirable.

SUMMARY OF THE INVENTION

The present invention relates generally to an integrated optics encryption device. The preferred embodiment of the invention is an integrated optics encryption device comprising a coherent light source connected to a multi-function integrated optics chip (MIOC). The MIOC comprises two divergent paths with mirrored ends. The MIOC also has an encrypted message output. One path is connected to a message signal input that can alter the refractive index of the path. The other path is connected to a key signal input that can alter the refractive index of the other path. The two paths form portions of two legs of an interferometer whose intensity output is proportional to the total phase difference between light waves traveling in the two paths.

The preferred embodiment of the invention also lends itself to a useful method for encryption using interference from a coherent light source comprising the steps of:
- issuing a coherent light signal from a coherent light source through a fiber optic connection to a multi-functional integrated optics chip;
- dividing the light signal into two paths within the multi-functional integrated optics chip;
- issuing pre-determined signals to the paths of the multi-functional integrated optic chip where a message signal input is attached to one path of the multi-functional integrated optics chip and a key signal input is attached to the other path;
- recombining the divided light signal to create an encrypted signal; and,
- outputting the encrypted signal via an encrypted message output.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 is a circuit diagram of a preferred embodiment of the invention.

FIG. 2 is a signal diagram of various signal inputs and outputs of the invention.

FIG. 3 is a table for a basic encryption key used with a preferred embodiment of the invention.

FIG. 4 is a diagram of an alternative preferred embodiment of the invention.

FIG. 5 is a diagram of an alternative preferred embodiment of the invention.

DETAILED DESCRIPTION OF THE PREFERRED EMBODIMENTS (1) The following description is provided to enable any person skilled in the art to make and use the invention and sets forth the best modes contemplated by the inventors of carrying out his invention. Various modifications, however, will remain readily apparent to those skilled in the art, since the general principles of the present invention have been defined herein specifically to provide an integrated optics encryption device.

(2) Referring now to FIG. 1, a preferred embodiment of an integrated optics encryption device 10 comprises a coherent light source 20. In the preferred embodiment, the coherent light source 20 is a laser, including but not limited to a laser diode. The coherent light source 20 is connected by fiber optic link 25 to a multi-function integrated optics chip (MIOC) 30. The MIOC 30 in the preferred embodiment comprises a lithium-niobate chip. In the embodiment of FIG. 1, the MIOC 30 comprises two divergent paths 40 and 50 with ends 45 and a loop 60. The MIOC also has an encrypted message output 70.

(3) Referring to FIG. 4, the MIOC 30 in an alternative embodiment comprises two divergent paths 40 and 50 with ends 45, each end 45 being mirrored to reflect light signals. In a preferred embodiment, each end 45 is coated with a metallic film or a multi-layer dielectric film to form a reflector for each path 40 and 50. Referring to FIG. 5, the MIOC 30 in another alternative embodiment comprises two divergent paths 40 and 50 meeting at a convergent end 47 connected to the encrypted message output 70.

(4) In each embodiment, one path 40 is controlled by a message signal input 80 that can reversibly alter the refractive index of the path 40. The message signal input 80 is preferably a pair of metal electrodes attached to the MIOC 30 that receive signals that change the voltage between the electrodes and alter the refractive index of the path 40 on the MIOC 30. By altering the refractive index of the path 40, the message signal input 80 can allow a light signal to combine coherently with a light signal passing through path 50, to produce a maximum or minimum intensity output 57 when they recombine at junction 55. The message signal input 80 is typically connected to message signal generating means such as a pulse signal generator, computer or any other source of digital signal input.

(5) In each embodiment, one path 50 is controlled by a key signal input 90 that can reversibly alter the refractive index of the path 50. The key signal input 90 is preferably a pair of metal electrodes fabricated on the MIOC 30 that receive signals that change the voltage between the pads and alters the refractive index of the MIOC 30, within the path 50. By altering the refractive index of the path 50, the key signal input 90 can allow a light signal to combine coherently with a light signal through path 50 to produce a maximum or minimum intensity output when they recombine at junction 55. The key signal input 90 is typically connected to a key signal generating means such as a pulse signal generator, computer or any other source of digital signal input. It can also be connected to another MIOC. It is preferred that the key signal generating means act as a random number generator.

(6) One embodiment of the encryption process is shown in FIG. 2. Upper signal level 86 indicated in FIG. 2 corresponds to a II/2 radian phase shift for the message signal 85. Lower signal level 87 of message signal 85 is a 0-radian phase shift. Lower signal level 97 of key signal 95 corresponds to a II radian phase shift whereas upper signal level 96 of key signal 95 corresponds to a 3II/2 phase shift. Preferably, the key signal 95 is from a random number generator. It should be noted that the voltage levels applied to the electrodes 80 and 90 on the MIOC 30, and hence, the relative phase shift between the optical wave, only exist for a time T (tau) equal to the time required for each optical wave to propagate from one signal input, through the interferometer/MIOC 30, to the other signal input. Therefore, the voltage levels applied to the electrodes must be charged every T (tau). The message signal 85 and the key signal 95 are kept in phase by a software driver program.

(7) To summarize, a coherent light signal is split between two paths 40 and 50. If neither a message signal 85 nor a key signal 95 is input, the divided light signal cancels itself out and no encrypted message signal 100 is emitted. When either a message signal 85 or a key signal 95 are input alone, the MIOC 30 emits an encrypted message signal 100 from the encrypted message output 70. When both a message signal 85 and a key signal 95 are input the light signals cancel each other out and no encrypted message signal 100 is emitted. In FIG. 2, the message signal 85 is transformed by the key signal 95 to the encrypted message signal 100. This is an "Exclusive Or" (XOR) encryption algorithm and a symmetric encryption algorithm.

(8) Thus, the simple encryption table in FIG. 3 becomes apparent. In the 0,0 position of FIG. 3, neither a message signal 85 nor a key signal 95 are input. Thus, no encrypted message signal 100 results. In the 0,1 position of the table, no message signal 85 is input and a key signal 95 is input. Thus, an encrypted message signal 100 results. Again, an "Exclusive Or" algorithm is depicted.

(9) A method for encryption using interference from a coherent light source therefore becomes apparent. The method comprises the following steps:

(10) Issuing a coherent light signal from a coherent light source 20 through a fiber optic link 25 to a multi-functional integrated optics chip 30;

(11) Dividing the coherent light signal along two paths 40 and 50 within the multi-functional integrated optics chip 30;

(12) Issuing pre-determined signals 85 and 95, respectively, from a message signal input 80 attached to one path 40 of the multi-functional integrated optics chip 30 and a key signal input 90 attached to the other path 50;

(13) Recombining the divided light signal to create an encrypted message signal 100; and,

(14) Issuing the encrypted signal from an encrypted message output 70.

(15) Another user with an identical key signal 95 can decrypt the encrypted message signal 100 by using the above method and substituting the encrypted message signal 100 for the message signal 85. The resulting signal issued by the device will be the original message signal 85. By applying the key signal 95 to the encrypted message signal 100, the message signal 85 appears and can be read by a photodiode as any other digital signal or message clear text detailed in the prior art.

(16) Therefore, the present invention has several advantages over the prior art. The preferred embodiments of the invention and the method of using them rapidly encrypt a message signal 85 as it is generated by simultaneously applying a key signal 95 using hardware instead of software. Translation from message signals to encrypted signals occurs rapidly in comparison to software data encryption methods. The preferred embodiment of the invention can operate at 10 gigahertz (10 GHz) or higher. A user may still utilize prior art software encryption methods in addition to the present invention for increased security. The "Exclusive Or" algorithm detailed herein also doesn't require the use of public keys and/or prime numbers. In fact, when the key signal 95 comes from a random number generator, this invention creates a stream cipher that approximates a "one-time pad." A "one-time pad" is generally assumed to be an unbreakable method of encryption when a potential eavesdropper has no access to the one-time pad.

(17) In each of the above embodiments, the different positions and structures of the present invention are described separately in each of the embodiments. However, it is the full intention of the inventor of the present invention that the separate aspects of each embodiment described herein may be combined with the other embodiments described herein. Those skilled in the art will appreciate that adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An integrated optics encryption device comprising:
   a wave guide having an input, a first optical path with a controllable refractive index, a second optical path with a controllable refractive index, and an output;
   a coherent light source connected to the input of the wave guide;
   a message signal source connected to the wave guide for controlling the refractive index of the first optical path; and
   a key signal source connected to the wave guide for controlling the refractive index of the second optical path;
   whereby an encrypted message appears at the output of the wave guide, the encrypted message comprising light split from the coherent light source that passed through the first optical path combined with light split from the coherent light source that passed through the second optical path.

2. The integrated optics encryption device of claim 1 where the wave guide produces "exclusive or" functionality based on the message signal input and the key signal input.

3. The integrated optics encryption device of claim 1 where the coherent light source is a laser diode.

4. The integrated optics encryption device of claim 1 where the wave guide further comprises an encrypted message signal output.

5. An apparatus that produces an optical signal encoded with an encrypted message by splitting coherent light into a first optical signal and a second optical signal, encoding the first optical signal with a message to be encrypted by controlling the flow of light through a first optical path by controlling the refractive index of the first optical path, encoding the second optical signal with a key by controlling the flow of light through a second optical path by controlling the reflective index of the second optical path, and combining the first and second optical signals to produce the optical signal encoded with an encrypted message.

6. The apparatus of claim 5 where the first and second optical paths of the apparatus are divergent paths, each path comprising an end.

7. The apparatus of claim 6 further comprising a loop at the end of each path.

8. The apparatus of claim 6 wherein each end is mirrored.

9. The apparatus of claim 5 where the first and second optical paths of the apparatus are divergent paths that meet at a convergent end.

10. The apparatus of claim 5 where at least one signal generating means is connected to affect the refractive index of the first optical path and at least one signal generating means is connected to affect the refractive index of the second optical path.

11. An integrated optics encryption device comprising:
a multi-functional integrated optics chip, having an input, an output, a message signal input, a key signal input, and two optical paths with mirrored ends;
a signal generator connected to the message signal input of a first optical path for controlling the refractive index of the first path;
a signal generator connected to the key signal input of a second optical path for controlling the refractive index of the second path; and
a coherent light source connected to the input of the multi-functional integrated optics chip;
whereby an encrypted message appears at the output based on the message signal input and key signal input.

12. The integrated optics encryption device of claim 11 where the message signal input connected to the first path reversibly alters the refractive index of the first path and the key signal input connected to the second path reversibly alters the refractive index of the second path.

13. The integrated optics encryption device of claim 11 where at least one signal generating means connected to the key signal input is a random number generator.

14. The integrated optics encryption device of claim 11 where the coherent light source is a laser.

15. The integrated optics encryption device of claim 11 where the coherent light source is a laser diode.

16. A method for encryption comprising the steps of:
dividing a coherent light signal from a coherent light source into two paths;
encoding a message signal on a first path of the coherent light signal by controlling the refractive index of the first path and encoding a key signal on a second path of the coherent light signal by controlling the refractive index of the second path; a
recombining the divided encoded light signal to create an encrypted signal.

17. The method of claim 16 where the message signal and key signal reversibly alter the refractive index of the path.

18. The method of claim 16 where the key signal is a random number generator.

19. The method of claim 16 where each path has a mirrored end.

20. A method for decryption comprising the steps of:
dividing a coherent light signal from a coherent light source into two paths;
using an encrypted message signal to modify a first path of the coherent light signal by controlling the refractive index of the first path and using a key signal to modify a second path of the coherent light signal by controlling the refractive index of the second path;
recombining the divided modified light signal to create a message signal.

* * * * *